Aug. 25, 1970  K. G. AHLEN  3,525,422

HYDROSTATIC BRAKES

Filed Aug. 29, 1968  8 Sheets-Sheet 1

United States Patent Office 3,525,422
Patented Aug. 25, 1970

3,525,422
HYDROSTATIC BRAKES
Karl Gustav Ahlen, Stockholm, Sweden, assignor to S.R.M. Hydromekanik AB, Stockholm-Vallingby, Sweden, a corporation of Sweden
Filed Aug. 29, 1968, Ser. No. 756,119
Claims priority, application Great Britain, Sept. 15, 1967, 42,266/67
Int. Cl. F16d 57/06
U.S. Cl. 188—92                     36 Claims

ABSTRACT OF THE DISCLOSURE

A hydrostatic-hydrodynamic brake wherein a fluid pocket is formed between a shoe and a pair of meshing gears to be braked. For braking, fluid is introduced to the pocket and the shoe is moved against the gears to prevent the escape of fluid from the pocket. During free running, the gears are free of oil drag. A piston and cylinder unit control movement of the shoe.

---

The invention relates to a hydrostatic-hydrodynamic brake, particularly for land vehicles, the brake including a pair of meshing gears which run in oil during braking, at least one of the gears being driven from a shaft to be braked, and a brake shoe displaceable relative to the gears according to the braking power desired.

Similar brakes of hydrodynamic construction are known, see, for United States patent specification 1,692,-801, but known brakes have the disadvantage that power losses, due to the continuous rotation of the gear wheels in oil during free running, are considerable or that, if these brakes are constructed sufficiently small in order to have acceptable free running or no-load losses, the braking capacity is so small that the brakes do not come under consideration for modern heavy-duty vehicles.

In order to avoid the no-load losses of a brake working in the manner of a gear pump, it is also already known from U.S.A. patent specification 3,159,246, to arrange, between the brake and the shaft to be braked, a friction clutch which is engaged only for braking. Due to the additional clutch and the hydraulic balancing control necessary for achieving smooth application when braking, this known construction is, however, very complicated and is, consequently, usable only for expensive installations.

Accordingly the present invention is directed to the removal of this deficiency and, during free running, the gears run dry except for any necessary lubrication and oil supplied to the region of intermesh of the teeth takes place only when braking is required. With a brake according to the invention the no-load losses of the brake are reduced to less than 1/500 of the known brakes and unnecessary heating of the oil is avoided. In addition foaming and irregularity of braking is avoided. The invention therefore renders possible the construction of a practically feasible hydrostatic brake without using a disconnecting coupling. Moreover, a brake according to the invention has very small no-load losses, for the high braking capacities necessary for modern, high speed heavy-duty and passenger vehicles.

Further, since the oil supply to the gear-wheels takes place only when the brake shoe is applied, the advantage of loss-free running during normal travel attained by means of the invention, does not need to be off-set by the disadvantage of a longer response time of the brake.

The inventon will now be described by way of example with reference to the accompanying drawings in which.

Figure 1:
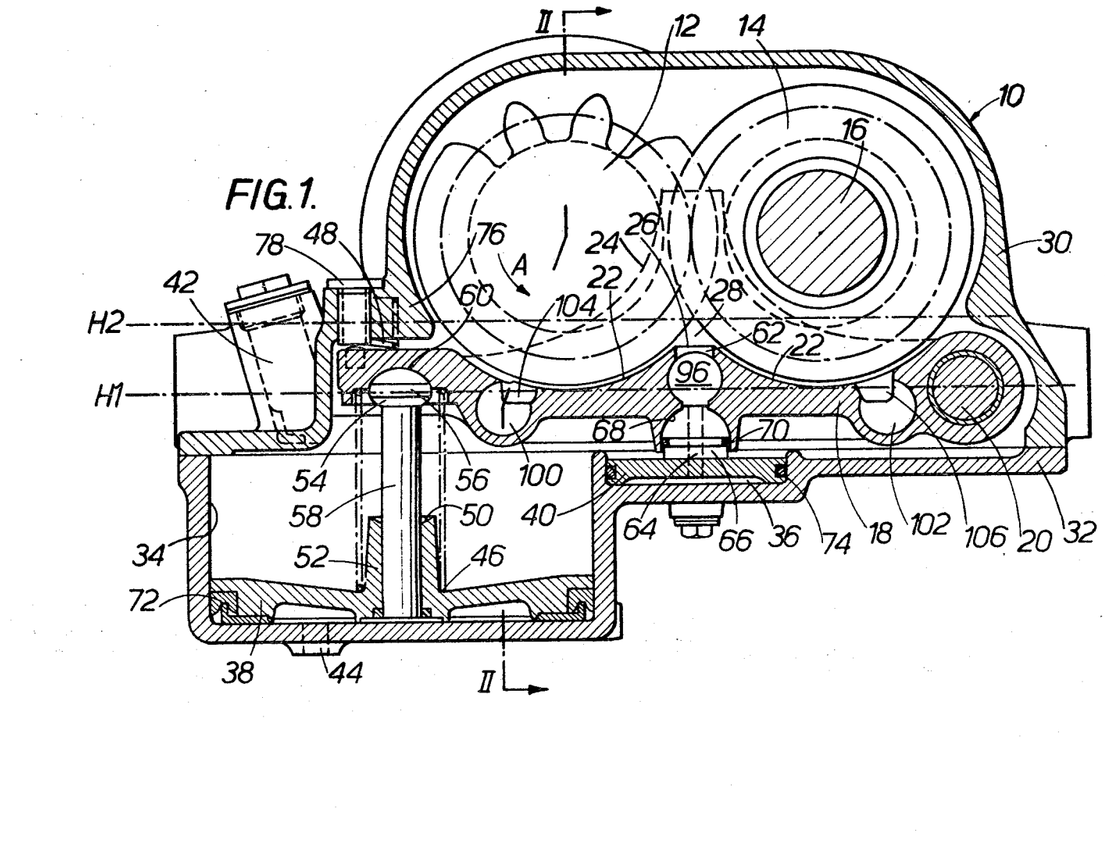
FIG. 1 is a cross-section through a first embodying example of brake according to the invention.
Figure 2:
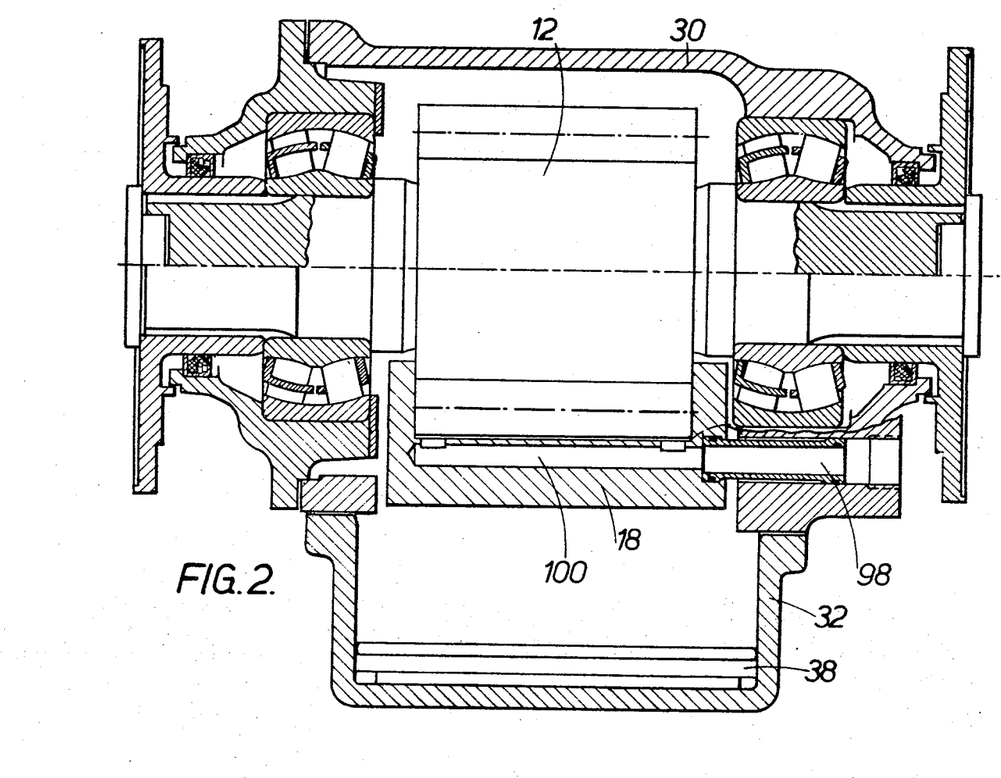
FIG. 2 is a section along line II—II in FIG. 1, FIGS. 3–5 profiles of preferred tooth forms for the gear-wheels of the brake.
Figure 6:
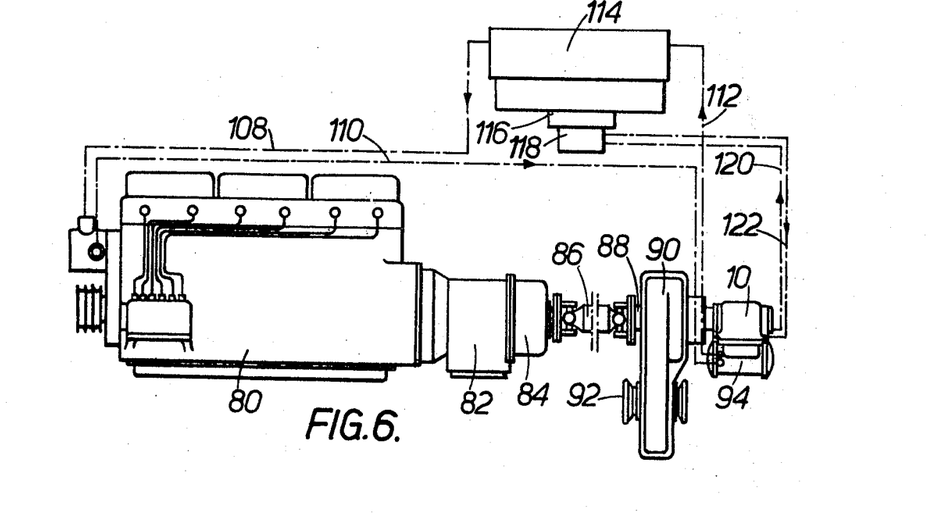
FIG. 6 shows the brake according to FIGS. 1 and 2 wherein the cooling installation of the brake is connected to cooling installation of a water-cooled engine.

A brake 10 according to the invention, is shown in FIGS. 1 and 2, and can be located at any position on a drive shaft as well as at the end of a drive shaft, see, for example, according to FIG. 6. A gear 12 is keyed to the shaft to be braked and meshes with a further gear-wheel 14. The latter is either freely rotatable on a lay shaft 16 lying parallel to the shaft to be braked or is freely rotatable with the lay-shaft 16. The direction of rotation of the two intermeshing gear wheels 12 and 14 must remain constant for braking with gear 12 rotating in the direction of arrow A. From this it follows that the gear shaft, e.g. the driven shaft of a hydrodynamic-mechanical gear, must turn in a constant direction. A gear for changing the direction of rotation, e.g. for changing between forward and reverse drive, must therefore be arranged in, for example, behind the gear 10 in rail vehicles when viewed in the direction of the power flow.

A brake shoe 18 cooperates with the gear-wheels 12 and 14 and is mounted to pivot horizontally on a fixed spindle 20. The shoe has two part-circular sectioned recesses 22, the diameters of which are adjusted to the diameters of the addendum circle of the gear-wheels 12 and 14 and, when the brake shoe 18 is pivoted clockwise about the spindle 20 the circular faces of the recesses form peripheral sealing surfaces with the gears 12, 14. Side plates 24 of the brake shoe 18 form sealing surfaces with front and rear faces of the gears 12 and 14.

As may be seen from the drawings, the circular sealing surfaces 22 do not intersect in acute-angled transition reaching as far as engagement between the gear-wheels 12 and 14, but this transition is formed by means of a flat surface 26. Thus, if the brake shoe 13 is pressed in a direction against the gear-wheels 12 and 14, a free space or pocket 28 remains between the surface 26 and the two gear-wheels.

In the case of the example according to FIGS. 1 and 2, the brake possesses a self-contained casing consisting of an upper casing 30 and a lower casing 32. The shafts of the gear-wheels and the spindle 20 carrying the brake shoe 18 are mounted in the upper casing 30. In the lower casing 32 cylinders 34 and 36 for an actuating piston 38 and a balancing piston 40 are incorporated. Both pistons operate on the brake shoe 18 in that, on actuation, they press it against the gear-wheels.

A braking effect is attained if the two gear-wheels 12 and 14 run in oil and the brake shoe 18 is pressed towards them. In operation the teeth of the two contra-rotating gears 12, 14 convey oil into the space 28 and oil is squeezed out from between the meshing teeth and between the peripheries of the gear wheels and associated recesses 22 as well as between the end sealing surfaces 24, of the brake shoe 18 and the end faces of the gears causing power dissipation. The said power dissipation forms the braking power.

In a brake of the invention, the gear-wheels 12 and 14 do not run continuously in oil which is introduced for each braking process. In the embodiment of the brake according to FIGS. 1 and 2, it is provided that the oil necessary for braking is filled into the closed brake-casing and remains therein. A closable oil inlet 42 is located on the left side of the casing 30, 32 in the representation according to FIG. 1. In the free position of the brake, oil, which also fills the cylinders 34 and 36 above the pistons 38 and 40 when in the released position of the brake on the bottom of these cylinders, is poured into the oil inlet 42 until it rises to a level H1. At this oil level, the gear-wheels 12 and 14 do not run in the oil, not even with their lowest teeth, and consequently run with small power losses, without squeezing out oil.

For braking, compressed air is conveyed through an inlet 44 into the cylinder 34 below the piston 38. By this means, the piston 38 lifts thereby stressing a compression spring 46 expanded between it and the brake shoe 18 which spring returns piston 38 after braking into its starting position. However, at this stage a compression spring 48 between the brake shoe 18 and the upper casing 30 acting against compression of spring 46 restrains the shoe from sealing contact on the gear-wheels 12 and 14. Now with the lifting of the piston 38 alone, the oil level in the brake casing rises and reaches the gear-wheels. The brake shoe 18 is not until then pivoted clockwise about its bearing spindle 20 by the actuating piston, when a convex bearing surface 50 at the upper end of a piston shaft 52 pointing upwards bears on a corresponding convex countersurface 54 on the under side of the head 56 of a bolt 58 passing in an axial central boring through the actuating piston 38 and its shaft 52 and, through the bolt-head 56, presses against the brake shoe 18. Because of the pivoting movement of the brake shoe 18 between the latter and the head 56 of the bolt 58 a ball joint 60 is provided. In this upper position of the actuating piston 38, the oil level reaches the level H2 marked by the broken line. At this oil level, braking takes place. Thereafter, if the pressure below the actuating piston 38 is released, it moves back under the pressure of the spring 46 to the bottom of the cylinder 34, whereby not only does the brake shoe 18 separate from the gear-wheels 12 and 14 but also the oil level again falls to the level H1.

In the embodying example described, the actuating piston 38 is therefore made relatively large in order to be able to lift a sufficient large volume of oil that the oil level in the whole brake casing rises from level H1 to level H2. It is not intended on the other hand by this measure that the reactive force of the oil trapped between the gear-wheels 12 and 14 and the brake shoe 18 shall be taken up by the latter alone through the actuating piston 38. For compensating the largest part of the reactive force, the balancing piston 40 is urged upwardly by the same pressure as that in the space 28. For this purpose, a channel 62 leads from the recessed surface 26 in a vertical direction through the brake shoe 18 and has a connection with a bore 64 extending in an axial direction through the balancing piston 40 and its shaft 66, which, as is also the case with the actuating piston 38, engages the brake shoe through a ball joint 68. Through the channel 62 and the bore 64 oil passes at the high pressure of the space 28 under the balancing piston 40 and thereby relieves the actuating piston 38. It is expedient to so dimension the diameter of the latter that the maximum moment of the brake is obtained by the exploitation of the pressure of the compressed air present. The sealing in the ball joint 68 between the brake shoe 18 and the piston shaft 66 in this case takes place by means of a packing ring 70. For the sealing of the pistons 38 and 40 in the cylinders 34 and 36 packings 72 and 74 are provided.

Determinative of the braking power of the gear brake according to the invention and additional to the close clearance of the sides 24 of the brake shoe 18 to the faces of the gear-wheels 12 and 14, is the clearance between the peripheral sealing surfaces 22 and the teeth of the gear-wheels. In order to prevent metallic contact between the gear-wheels and the brake shoe and to be able to adjust to the least value of the clearance, which as remains to be discussed later, is important for the braking characteristics, a stop is provided for the brake shoe 18. The stop may, for example, consist of a set-screw 78 which can be screwed more or less deeply into a shoulder 76 of the upper casing 30.

Figure 3:
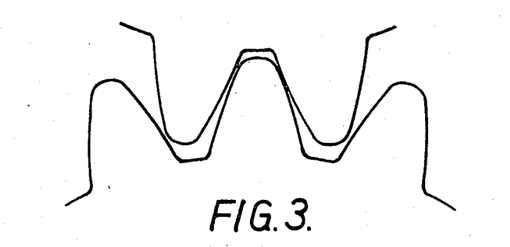
Figure 4:
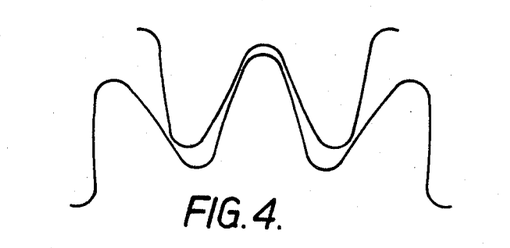
Figure 5:
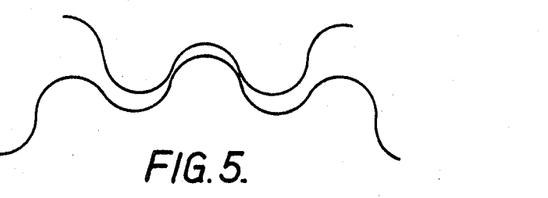

In experiments with prototypes of the brake according to the invention, it has been shown that a relatively loud noise develops if the gear-wheels 12 and 14 are made with normal toothing, e.g. involute toothing. Noise generation could be substantially reduced, as we found, if the teeth are rounded off at the crest and/or at the root. In FIG. 3 is shown such a preferred tooth-form in profile, in which, compared with involute toothing, only the tooth crests were rounded off. A further improvement resulted if, additionally, according to FIG. 4, the fillets at the tooth root are made round. Finally, tooth profiles are shown in FIG. 5 in which the involute form is dispensed with and the tooth form is determined only by circular arcs. In this case there is a substantial advantage in that the relative movement between the points of contact of the two wheels during engagement is very small or nothing at all, so that in a brake of the kind in question a hard particle, which gets between the teeth, transfers no material from the one gear-wheel to the other, or builds up material on the one or the other gear-wheel, which can happen in involute toothing and then necessarily lead to the stoppage of the gear-wheels.

FIG. 6 shows a brake according to the invention of the kind according to FIGS. 1 and 2 in an actual application, by means of which a preferred cooling system will be explained subsequently. FIG. 6 shows, an engine 80 of an automobile or even of a locomotive which acts on a gear 82 from which the translated torque is transmitted through a clutch 84 and a cardan shaft 86 to the input shaft 88 of a reversing gear 90. The power flow then passes through this latter to the driven shaft 92 thereof and thence to the driven wheels of the vehicle. The brake 10 according to the invention, incorporated with an oil cooler 94, is mounted on the extension of the input shaft 88 of the reversing gear 90 since this shaft always rotates in the same sense.

For explaining the working of the cooling system of the gear brake 10 in FIG. 6 brought into use in the case of the example, reference is again made to FIGS. 1 and 2. It is evident that the heat arising in the brake is first taken up by the brake oil, consequently, a technically useful solution of the normally difficult problem of cooling is obtained if, to the oil supply in the brake casing, a cooling circuit is attached, in which heated oil is sucked out of the brake casing and passed to an oil cooler whence it is fed back to the oil supply in the brake casing.

This basic concept may be further developed in a brake according to the invention and, in order to convey the oil from the brake to the oil cooler 94 according to FIG. 6 and back, use is made of the pressure drop between the space 28 and the free inner space of the brake casing. For this purpose, there is made in the brake shoe 18 a median transverse bore 96 which passes through the vertical channel 62 leading from the space 28 to the balancing piston 40 so that the pressure oil also passes from the space 28 to the transverse bore 96. From this, the oil is fed through a pipeline of the kind of the movable connecting pipe 98 represented in FIG. 2, kept movable between it and the upper casing 30 on account of the pivotability of the brake shoe 18, to a further transverse boring 100 and through a forwarding pipeline, which is not shown for simplicity of representation, into the oil cooler 94. The feed-back of the oil then takes place in the same way through the intermediate pipeline 98, kept movable, and a similarly formed parallel intermediate pipeline into a transverse bore 100 and a further parallel transverse boring 102 into the brake shoe 18. Grooves 104 and 106 lead the transverne bores 100 and 102 to to the inlet sides of the sealing surfaces 22. Since the oil returning from the oil cooler is not allowed to flow freely into the brake casing, but first passes into the pressure zone between the gear-wheels and the brake shoe, frothing is effectively prevented.

In a further development of the invention a matching of the cooling power of the oil cooler 94 to changing braking conditions has also been considered. The measures devised in this respect are described with reference to FIG. 6 hereafter.

The oil cooler 94 is constructed as a heat-exchanger, the cooling medium of which is the circulating cooling water of the engine 80. The installed cooling water circulation is indicated in FIG. 6 by the pipelines 108, 110 and 112. Through the pipeline 108 flows cooling water from a water cooler 114, possibly cooled by a fan, to the engine 80. The pipelines 110 and 112 lead back from the engine to the water cooler 114, but, in so doing, the oil cooler 94 is included. At the water cooler 114 there is provided, in addition to a fan possibly present, a further fan 116, which is driven by a hydraulic motor 118. It is also possible to allow the hydraulic motor 118 to act on the fan in addition to the engine driving a fan already possibly present or to increase the capacity of a fan motor already normally present by means of the pressure oil serving as driving means of the hydraulic motor. The pressure oil for the hydraulic motor 118 drawn in the case of the example is supplied thereto through a pipeline 120. The feed-back of the oil takes place through a pipeline 122. It is an advantage of the gear brake in accordance with the invention that it can supply the pressure oil for the hydraulic motor 118, even during braking, because, for example, in an already very hot engine the hydraulic system may include a thermostatically controlled valve (not shown) of known construction to connect the pipeline 120 to one of the connecting pipelines between the transverse bore 96 and the oil cooler 94, so that the pressure oil flows from the space 28 not only to the oil cooler 94 but also to the hydraulic motor 118. The oil flowing back therefrom through the pipeline 122 is fed back to the oil supply in the brake casing.

Figure 13:
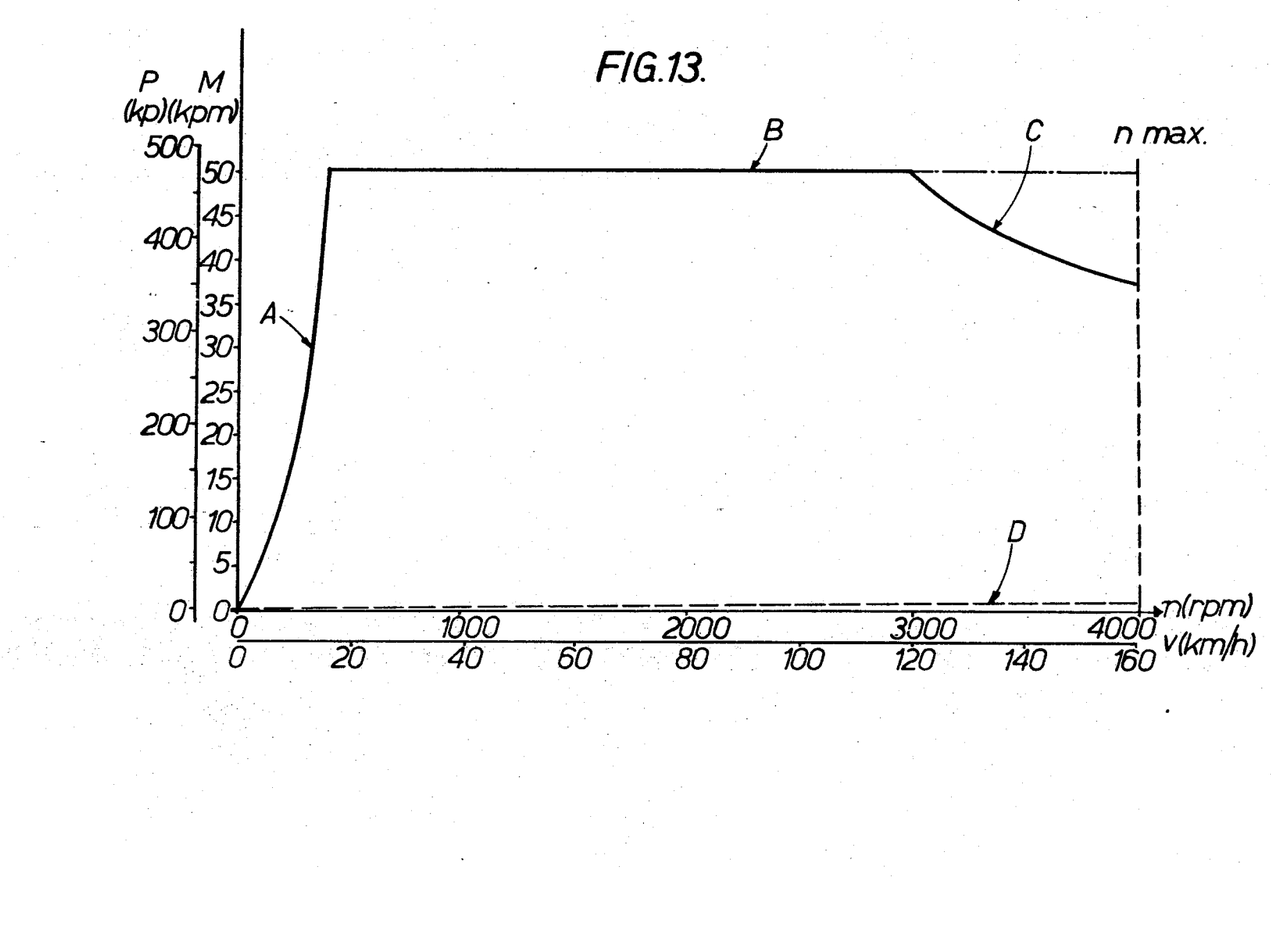
FIG. 13 is a diagram of the braking power plotted against the revolutions of the driven shaft.

It is natural that the removal of oil from the space 28 for the above described cooling circulation of the oil, which can be regulated thermostatically in a known way so as to cut in and out or even can be altered according to the desired flow because of the possible additional consumption of pressure oil from the space 28 for the operation of a hydraulic motor 118 for a fan, on account of the associated pressure drop between the gear-wheels 12 and 14 and the brake shoe 18 must lead to a reduction of the braking power at the boundary line A in FIG. 13 (cf. also in the observations to FIG. 13). The cooling requirement is, in this lowest speed range, so little however that the shifting of the boundary line A is not of importance in practice. On the other hand, by means of the described arrangement, the great advantage arises that the brake with the cooling arrangement provided, particularly with the increase in the capacity of the engine-cooling installation, can be designed in principle for greater power than without this cooling arrangement.

Figure 7:
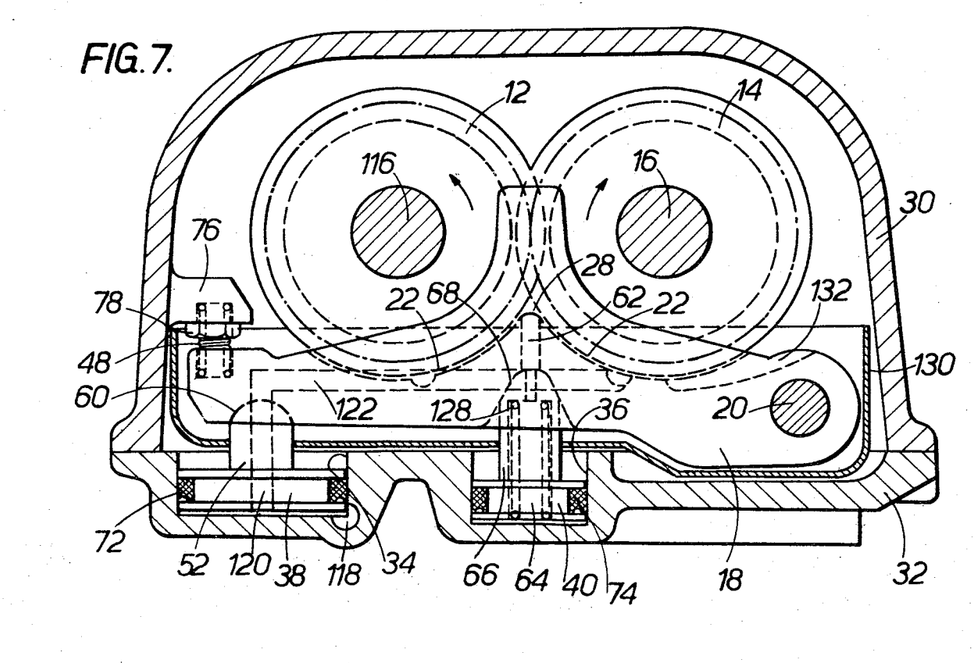
FIG. 7 is a cross-section through a further embodying example of a brake according to the invention along the line VII—VII in FIG. 8.
Figure 8:
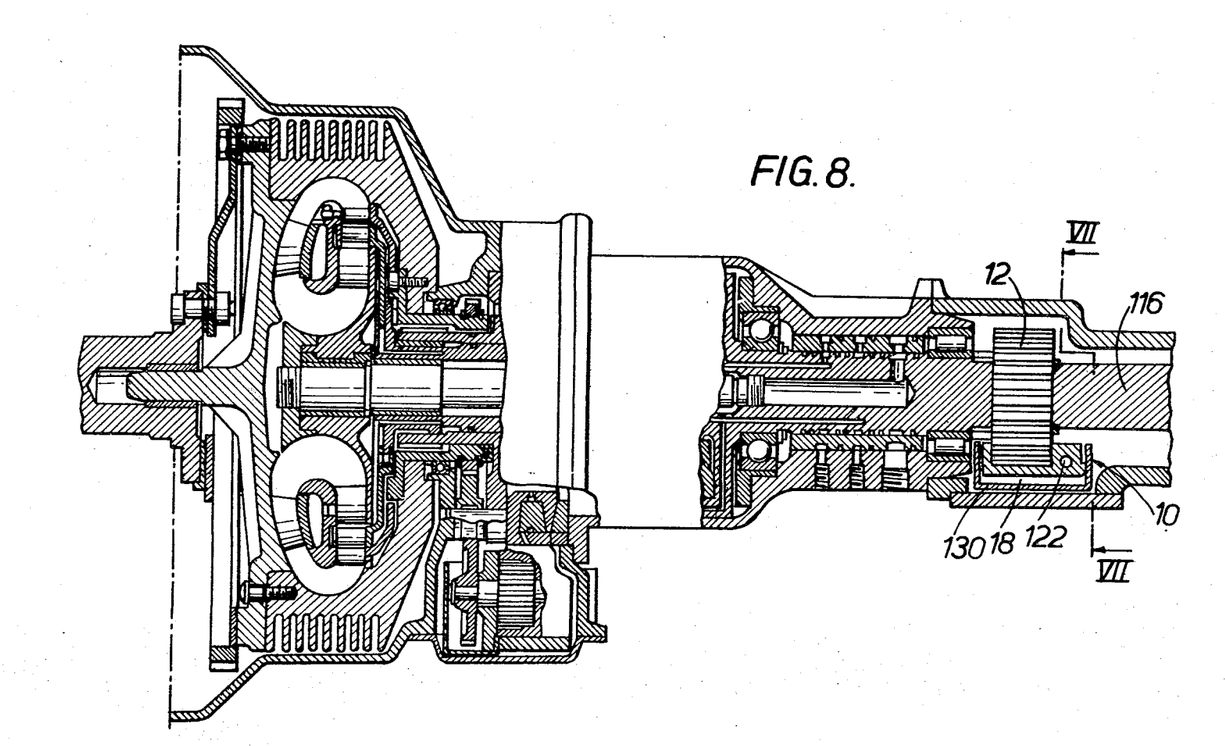
FIG. 8 shows a hydrodynamic-mechanical gear on the drive shaft of which is arranged a brake according to FIG. 7.

A second embodiment of a brake according to the invention is represented in section in FIG. 7. In the brake of the first embodiment according to FIGS. 1 and 2, there is provided a self-contained brake casing which is flanged on one side, or as according to FIG. 2 on both sides, to a casing lying alongside (not shown) but, for the gear brake according to FIG. 7, no self-contained casing is needed, and this fact will be appreciated from FIG. 8. In FIG. 8 a brake according to the invention is arranged on the drive shaft 116 of a hydrodynamic-mechanical gear, and the brake casing is part of the gearbox.

The construction of the gear brake according to FIG. 7 is basically the same as that of the brake according to FIG. 1. In the second embodiment, braking is effected by oil which is enclosed under pressure between two gear-wheels and a brake shoe provided with sealing surfaces on the face and the periphery and is squeezed out through close clearances. Just as in the previously described embodiment, an actuating piston and a balancing piston act on the brake shoe. On account of the extensive agreement, the individual parts comparable in function in the two described examples of the brake according to the invention have been provided with the same reference symbols. At this point, it is only necessary to go into the special features of the gear brake according to FIG. 7 as against that of FIG. 1.

Figure 9:
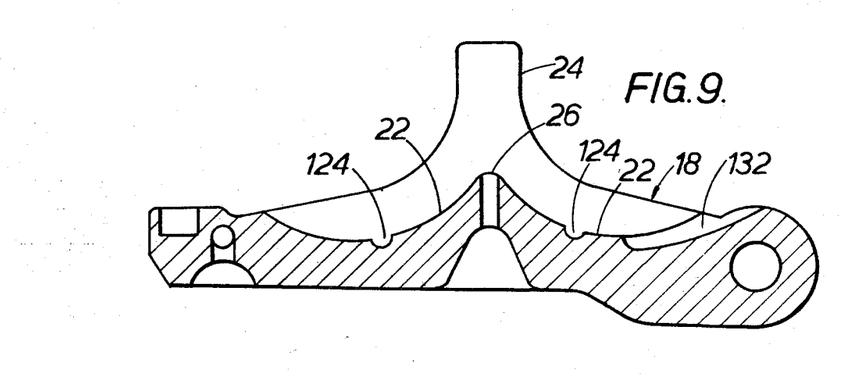
FIG. 9 is a medium longitudinal section through the brake shoe of the brake according to FIGS. 7 and 8.
Figure 10:
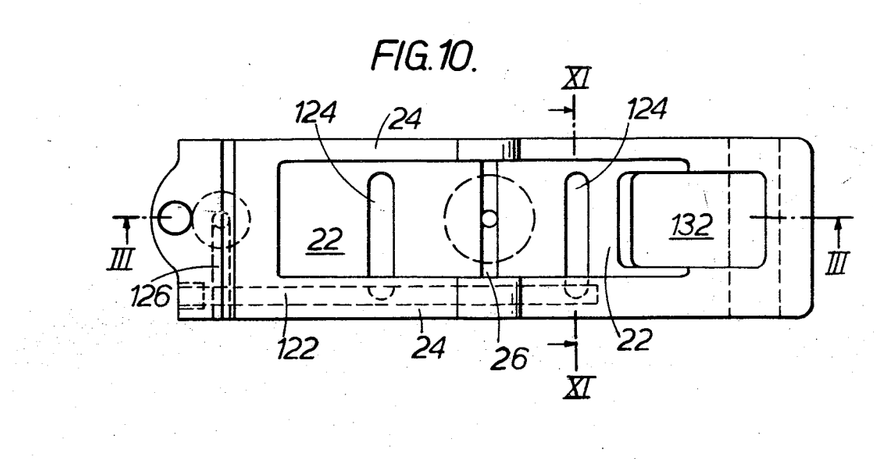
FIG. 10 is a plan of the brake shoe according to FIG. 9.
Figure 11:
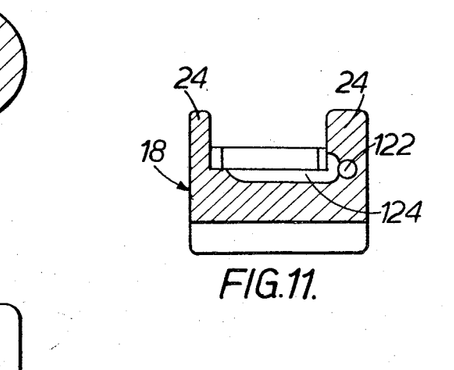
FIG. 11 is a cross-section through the brake shoe according to FIGS. 9 and 10 corresponding to the line of section XI—XI in FIG. 10.

Whereas the actuation of the brake according to FIG. 1 takes place by means of compressed air, in the brake according to FIG. 7 oil serves as pressure medium. The pressure oil is fed through a channel 118 to the cylinder 34 underneath the actuating piston 38. The piston moves upwards and thereby, presses through the ball joint 60, against the brake shoe 18. At the same time, pressure oil also passes through a bore 120 in the piston 38 and the piston shaft 52 into a longitudinal channel 122 in the brake shoe 18 joining in the ball joint 60 with the bore 120. This channel discharges at the peripheral sealing surfaces 22. So that the oil leaving the longitudinal channel 122 is immediately distributed over the whole tooth width, in the tooth gap of the teeth moving in towards the space 28, transverse grooves 124 (cf. FIGS. 9 to 11) are provided in the sealing surfaces 22, which have a connection with the longitudinal channel 122. Pressure oil is thus supplied to the tooth gaps at a point where no counter-pressure yet exists. It is then carried into the engagement area of the gear-wheels and squeezed out.

In the example, the longitudinal channel 122 runs in a side bar 24 of the brake shoe 18 (FIGS. 10 and 11) and the transverse grooves 124 also extend into this side bar. A transverse bore 126 (FIG. 10) then forms the passage between the bore 120 in the piston 38 and the laterally displaced longitudinal channel 122. The specialist will however be able, without difficulty, to determine a course for the oil guide in the brake shoe 18 differing for the example here shown, in order to direct pressure oil, on actuation of the piston 38, directly into the contra-rotating tooth gaps.

The oil carried with the gear-wheels 12 and 14 accumulates in the space 28 and a relatively high pressure builds up there. This pressure, just like that in the tooth gaps lying alongside for the time being, acts on the brake shoe 18 in a direction opposed to that of the force exerted by the actuating piston 38 on the brake shoe. Obviously, the piston 38 can be made correspondingly big in order to oppose to the reactive force arising during braking a sufficiently high actuating force. Just as in the previously described embodying example according to FIG. 1, a construction with a balancing piston 40 is preferred however, which is driven by the great pressure in the space 28. The sealing of the ball joint 68 between the brake shoe 18 and the shaft 66 of the balancing piston 40 takes place according to FIG. 7, differing from FIG. 1 in that a compression spring supported on the base of the cylinder 36 presses the shaft 66 in the ball joint 68 continuously into sealing contact against the brake shoe 18. With respect to the sealing in ball joint 60, the spring 48 also has the same function as the spring 128.

The immediate oil supply necessary for initiating the braking process takes place, as explained above, through the longitudinal channel 122. The oil emerging during braking at the sealing surfaces of the brake shoe 18 and sprayed from the turning gear-wheels collects in part in an oil pan 130 which surrounds the brake shoe 18 (cf. FIGS. 7 and 8). If in this oil pan the oil now rises to a level so that the oil reaches the teeth of the gear-wheels 12 and 14 entering the brake shoe 18, then there is an additional safeguard so that sufficient oil for the braking process enters between the meshing teeth of the gear-wheels. For facilitating the entry of the oil from the oil pan 130 between the gear wheel 14 and the corresponding peripheral sealing surface 22 of the brake shoe 18, there is made therein a recess 132 in the sealing surface 22 drawing in from the outside (cf. FIGS. 7, 9 and 10). Meanwhile, also after the pan 130 has been filled, oil flows in furthermore through the pressure piston 38 and superfluous oil flows away over the edge of the oil pan 130 of the gear. By this means there is automatically a cooling oil circulation wherein the cooling installation of the hydraulic gear also serves as cooling installation of the hydrostatic brake.

After braking, the oil supply through the longitudinal channel 122 is stopped. The rotating gear-wheels 12 and 14 throw off so much oil in a short time over the rim of the oil pan 130 so that over the recess 132, over which the last oil on the gear-wheels has passed, no more can continue to flow. The gear-wheels then run without oil to be squeezed out.

Figure 12:
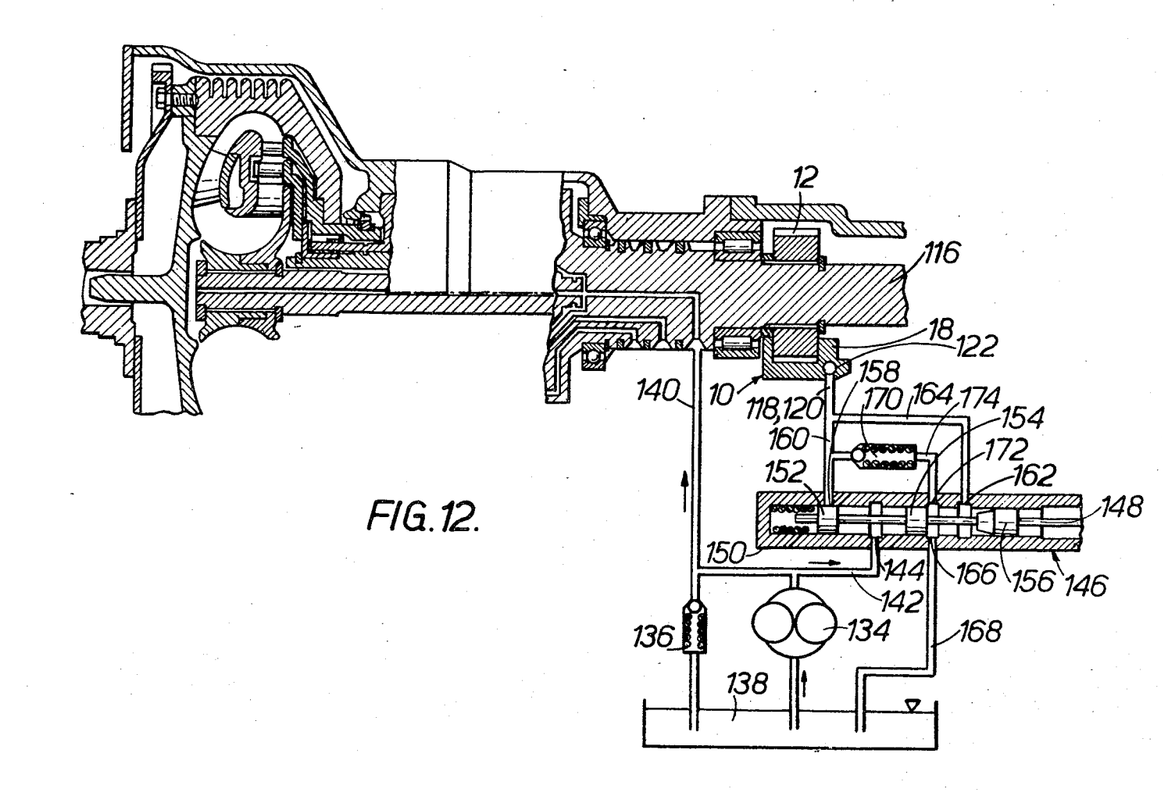
FIG. 12 is a diagrammatic representation of the oil pipelines and control members necessary for the actuation of the brake according to FIGS. 9 and 10.

The control of the brake according to FIG. 7 can be explained by means of FIG. 12. Therein may also be seen why the addition of the brake according to the invention to a hydrodynamic mechanical gear brings with it particular advantages. The basis for this lies in the fact that the control members of the brake can be freely interposed in the hydraulic system required for the hydraulic torque converter and, according to the form of the gear, for the actuation of the clutches in addition. Thus, for example, a single oil pump 134 can supply pressure oil both for the hydraulic torque converter and also for the gear brake. In part also, monitoring arrangements, such as in the case of the example an excess pressure valve 136, can serve both pipeline systems, both that of the gear and that of the brake.

The oil pump 134, which is driven in a known way by the engine of the vehicle, conveys oil from a sump 138 in the direction of the arrow shown in FIG. 12 through a pipeline 140 to the hydraulic torque converter of the gear and through a pipeline 142 to the inlet 144 of a valve designated 146 as a whole. In the valve 146 is mounted a control slide valve 148 mounted axially displaceable against the pressure of a spring 150. The control slide valve 148 is, for example, actuated by the brake pedal of a motor vehicle. On the control slide valve are mounted three valve pistons which are designated in what follows in accordance with the drawing as 152, 154 and 156. Of these, the valve piston 152 is intended for opening and closing an outlet 158, from which the oil fed to the valve 146 through the inlet 144 passes through a pipeline 160 and the already mentioned channel 118 and the boring 120 into the longitudinal channel 122 in the brake shoe 18.

The valve piston 152 acts in conjunction with the outlet opening 158 as a throttle which, in each case according to the clear cross-section of the outlet opening, reduces the oil pressure determined by the excess pressure valve 136 behind the pump 134. This pressure regulation is, however, not yet sufficiently sensitive. Consequently there is provided a pipeline 164 branching off from the pipeline 160 and leading back to an inlet 162 of the valve 146 which, according to whether the inlet through the valve piston 156 or an outlet 166 of the valve 146 through the valve piston 154 is open or closed, has a connection with the oil sump 138 through a feedback pipeline 168 or not.

During braking, the control slide valve 148 is moved to the left in relation to the valve 146. Thereby the valve piston 152 opens the outlet 158 increasingly, while the valve piston 156 which, as represented, is formed conical on one side, closes increasingly the inlet 162 and thereby reduces the flow-back possibility of oil from the pipeline 160. Both processes, the increasing opening of the outlet 158 and also the increasing closure of the oil flowback to the sump also taking place in the region of the cone of the valve piston 156, allow the oil pressure in front of the gear brake 10 to rise continuously and finely adjustably. The braking power is determined according to the oil pressure.

A limitation of the braking power in the range of low speed can be carried out by fixing a definite minimum value of the peripheral clearance between the gear-wheels 12 and 14 on the one hand and the brake shoe 18 on the other hand by means of the set-screw 78, as already pointed out. The possibility of an upper limit of the braking power depends on setting a maximum value for the oil pressure before the brake. That can take place by means of an excess pressure valve 170 which is placed in a branch pipeline 174 branching from the pipeline 160 and leading back to an inlet 172 of the valve 146 and responds if the back-acting pressure from the space 28 in the pipeline 160 exceeds a prescribed maximum. The maximum braking moment is then proportional to this oil pressure. The oil flowing through the pipeline 174 into the valve 146 is fed back to the sump 138 through the return pipeline 168. The valve piston 154 does not hinder this return flow since it closes the valve outflow 166 only when the brake is not operated.

In a retrospective comparison of the two embodiments of the brake according to the invention in accordance with FIG. 1 and FIG. 7 it can be affirmed as follows:

As in any gear pump, there arises in the gear pump according to the invention also, brief pressure variations or vibrations which result from the fact that in regular running of the gear-wheels 12 and 14 the oil displacement from the tooth gaps takes place irregularly. In the previously known gear brakes, in which the control of the brake shoe takes place directly through a mechanical, rigid connection to the brake pedal of the vehicle, these vibrations act very unfavourably. In the described embodiments of the gear brake according to the invention on the other hand, the pressure of a pressure medium used for actuation of the brake, in the one case compressed air, in the other case pressure oil, is adjusted, according to the desired braking power, by means of a throttle valve. By this means it is avoided that the pressure fluctuations of the brake at the brake pedal are traceable. Of course, this does not prevent pressure fluctuations from acting in the pipeline system of the pressure medium. The danger of damage arising therefrom is naturally greater when using an incompressible pressure medium, as for example oil, than when using compressed air which reduces pressure hammer. Consequently it is intended in the first place to install the brake according to FIG. 7 in smaller vehicles, such as for example passenger vehicles, and for greater loads, for example in locomotives and heavy-duty vehicles, to take the brake according to FIG. 1.

The said pressure fluctuations in the gear brake act as alternating forces, on account of the form of the brake shoe 18, on its mounting in a horizontal direction also. For the take-up of these forces, the pivot bearing provided for the brake shoe is in principle better suited than its fitting alone on an actuating piston lying below, as in the previously known brakes.

Further advantages of the hydrostatic hydrodynamic brake according to the invention as against the previously known brakes may be made clear by means of the course of the braking moment represented in FIG. 13, plotted against the revolutions. The curve path A-B-C gives the maximum braking moment at the revolution or speed plotted in each case on the abscissa. Braking values below the curve A-B-C are given from the intermediate position in each case of the control slide valve of the throttle valve in the supply pipeline of the pressure medium for the actuation of the brake. At a certain pressure of the pressure medium, the braking force or the braking moment remains constant during the subsequent reduction of the vehicle speed, until, in the lower speed range the curve section A is reached. The braking characteristic is therefore, up to an adjustable lower speed range, hydrostatic, although the construction of the brake itself, the conversion of the mechanical energy of the braked shaft to the pressure and kinetic energy of the brake oil and finally heat, might lead one to expect a hydrodynamic, i.e. a speed-dependent course of the braking moment, as is to be recorded in the previously known gear brakes. As opposed thereto, the advantageous, constant braking torque is attained by the control of the brake shoe 18, not directly through the brake pedal, but through a pressure medium. A certain actuating pressure has a quite definite pressure in the space 28 in consequence and, apart from the range of the curve section A, a quite definite torque independent of the revolutions of the gear-wheels 12 and 14. The constant pressure in the space 28 remains during braking and the reduction of speed until maintained in the lower range, because the brake shoe 18, corresponding to the quantity of oil, restricting itself with the dropping revolutions of the gear-wheels conveyed thereby, is applied increasingly closer to the gear-wheels 12 and 14 until the stop screw 78, by means of which the course of the hydrodynamic curve section A can be determined, prevents a further approach of the brake shoe 18 to the gear-wheels and thus at the end also excludes metallic contact between these parts.

The steep fall-off of the braking moment at low speed is due to the fact that with only slowly turning gear-wheels 12 and 14 a high oil pressure is not attained in the space 28 because the small quantity of oil conveyed by the gear-wheels to the space 28 (without generating a high pressure) can pass out through the clearances at the sealing surfaces of the brake shoe 18, particularly at the peripheral clearances adjusted by the set-screw 78. Obviously the pressure in the space 28, and consequently the braking moment, drops immediately to nil if the gear-wheels 12 and 14 remain stationary, which, for example, would be the case during skidding of the vehicle and the locking of the wheels. In that the braking power falls off rapidly immediately if the wheels of the vehicle tend to lock, this situation, feared by every driver, is effectively prevented.

The last described effect of the gear brake according to the invention would also be characteristic of typical hydrodynamic brakes. The advantages of the gear brake according to the invention as against such brakes consist however in the fact that the speed-dependent braking effect arises only at the end of the braking process and is adjustable. The relatively small lower speed range is to be controlled by a hand-brake so that such a brake, in conjunction with the gear brake according to the invention, also provides a braking system fully satisfying legal requirements. On the other hand, the conjunction of the known purely hydrodynamic gear brake with a hand-brake would be meaningless because the latter could not bridge over the large lower speed range, in which the braking moment of the hydrodynamic brake drops to nil.

The adjustment of the maximum braking moment in the section B of the curve in FIG. 13 takes place by means of the excess pressure valve 170. The maximum value of the braking force to be set is governed by the type and size of the vehicle and also, in particular, according to the performance provided by the oil cooler. If a construction, such as, for example, according to FIG. 1, is chosen in connection with FIG. 6 in which, on account of the oil cooling of the brake itself, oil can be extracted, there is obtained even during longer braking and high road-speed, no fall-off of the braking power. The fall-off of braking power in the upper revolution range shown by the curve section C is the consequence of a temperature-regulated reducing valve which will not be necessary in the normal way since, in braking above the limits in question, deceleration sets in rapidly and further braking then takes place within the limits provided.

In this connection it may be pointed out that the effective braking moment of all forces acting on a vehicle during braking is still somewhat greater than the maximum represented by the curve path A-B-C. To be taken into account particularly would be also the braking force of the engine itself, the gear friction and the air and rolling resistance.

In order to demonstrate how slight is the braking moment of the gear brake according to the invention at no-load, i.e. when the gear-wheels 12 and 14 rotate without oil to squeeze out, the corresponding curve D is shown with a broken line in FIG. 13. It is recognizable that in contrast to the previously known gear brakes, in which the gear-wheels are immersed in oil at no-load also, the power losses here remain negligible.

I claim:
1. A hydrostatic-hydrodynamic brake comprising two meshing gears, one of which is drivingly engaged with a shaft to be braked, a brake shoe displaceable relative to the gears to form a pocket between the shoe and the gears in the region of intermesh of the gears, actuating means including a fluid operated actuating piston operable when braking is required, for both (a) causing braking fluid to be introduced to the gears such that the fluid is carried into said pocket and (b) moving the brake shoe toward the gears to effect braking, said actuating means also including means, operable when braking is not required, for moving the brake shoe away from the gears and permitting braking fluid to leave the pocket, the gears and the shoe being arranged such that escape of said braking fluid from the pocket is limited when braking is required, wherein rotation of the gears is resisted by the trapped braking fluid in the pocket, whereby the actuating means controls the braking of the said one gear which is drivingly engaged with the said shaft to be braked by controlling the escape of said introduced braking fluid.

2. A brake according to claim 1 wherein the roots and crests of the gears are substantially semi-circular.

3. A brake according to claim 1 including a cooling system, and including means for circulating the braking fluid in the casing through said cooling system.

4. A brake according to claim 3, including a means for directing the circulating braking fluid to a fan motor for driving a fan, whereby the effectiveness of said cooling system is increased.

5. A brake, according to claim 4 wherein the brake is mounted on the driven shaft of a water-cooled engine, and wherein the cooling water of the engine serves as coolant for the braking fluid of the brake.

6. An arrangement according to claim 5 wherein said fan motor which is driven by pressure oil and the said fan are located so that the fan assists in cooling the braking fluid.

7. An arrangement according to claim 5 including a temperature responsive adjustable valve and wherein the flow of oil through the cooling system is governed by said valve in accordance with the temperature of the braking fluid.

8. A brake according to claim 3 wherein the brake fluid of the cooling system is taken from the pocket through a channel in the brake shoe, and including a pipeline through which the fluid is conducted between the brake shoe and the casing to a cooler and from which the fluid flows back into the casing.

9. A brake according to claim 8 including a further pipeline through which the oil returning from the oil cooler is led between the casing and the brake shoe and including channels in the brake shoe for discharging fluid at the peripheral sealing surfaces in the region of the contra-rotating teeth and onto the gears.

10. A brake according to claim 3, including means determining the quantity of braking fluid flowing through said cooling system in response to both the temperature of the oil and the pressure of the oil in the pocket.

11. A brake according to claim 3, including means for directing said braking fluid from the said pocket to the cooling system, and from the cooling system to the space between the gears and the brake shoe.

12. A brake according to claim 11, including means for directing said braking fluid, after leaving the pocket, to a fluid operated means to drive a fan for boosting the cooling effect of the cooling system.

13. A brake according to claim 12, wherein the brake is mounted on the driven shaft of a water cooled engine, and wherein the water from the cooling system of the engine also serves as a cooling medium in the said cooling system for the braking fluid, and wherein the said fluid operated means cools the said cooling fluid received from the engine.

14. A brake according to claim 1 including a spring located between a relatively fixed part of the brake and the brake shoe, and serving to move the brake away from the gears after braking.

15. A brake according to claim 1 including a return spring located between the actuating piston and the brake shoe.

16. A brake according to claim 1 including a control means for controlling the flow of pressure fluid from a pressure source to said actuating means, said control means including a modulating means for modulating the force with which the shoe is urged towards the gears by modulating the pressure delivered to said actuating means.

17. A brake according to claim 16, wherein said control means includes a servo-motor through which the braking fluid flows from said pressure source to said actuating means, said servo-motor including a throttle passage for effecting said modulation of the pressure.

18. A hydrostatic-hydrodynamic brake comprising two inter-meshing gears, one of which is drivingly engaged with a shaft to be braked, a brake shoe displaceable relative to the gears and forming with the gears a generally enclosed pocket in the region of intermesh of the gears, the brake shoe being substantially sealingly engageable with the end faces of the gears and portions of the peripheries of the gears, and including supply means operable when braking is required for introducing braking fluid to the gears such that the fluid is carried to the pocket, said gears and said shoe being arranged such that during braking, escape of said introduced braking fluid is limited such that rotation of the gears is resisted by the trapped braking fluid in the pocket, said supply means being selectively operable to prevent the introduction of braking fluid such that during free running of the gears, the braking fluid located in the pocket is permitted to escape so that the gears are permitted to run substantially free of oil drag during said free running.

19. A brake according to claim 18 including a servo means for displacing the brake shoe for controlling the braking force by modulating the pressure of the braking fluid in the pocket.

20. A brake according to claim 19 wherein the servo means is a servo system using an incompressible fluid.

21. A brake according to claim 19 wherein the servo means is a servo system using a compressible fluid.

22. A brake according to claim 18 wherein the gears and the brake shoe are mounted in an enclosed casing, the rotational axes of the gears normally being arranged generally horizontally in the casing, the level of braking fluid normally being below the gears when the brake is not actuated and said supply means including an actuating piston in a cylinder in communication with the interior of the casing, said piston being arranged such that when it is actuated it raises the level of braking fluid in the casing to at least the root circles of the gears and such that reverse displacement of the piston lowers the level of braking fluid to below the gears.

23. A brake according to claim 22 wherein the brake shoe is mounted for angular displacement for movement towards and away from the gears and including a stop member for limiting movement of the shoe towards the gears.

24. A brake according to claim 22 wherein the actuating piston is operable to exert the force necessary for moving the brake shoe in a direction towards the gears only when the oil level reaches at least as far as the root circles of the gears.

25. A brake according to claim 22, wherein the actuating piston is pneumatically actuable and includes a compressed air supply line having a pressure-regulating valve for varying the force exerted on the brake shoe, when the latter is displaced in the direction of the gears, according to the desired braking torque.

26. A brake according to claim 18 wherein at least one of the crests or the roots of the tooth flanks of the gears are rounded in cross-section.

27. A brake according to claim 18 including means for introducing braking fluid into the pocket through a channel in the brake shoe, the channel opening into the peripheral sealing surfaces of the brake shoe in the region of the contra-rotating teeth of the gears, such that the introduced fluid is carried to the enclosed pocket in the tooth gaps enclosed by the sealing surfaces of the brake shoe.

28. A brake according to claim 27 wherein the peripheral sealing surface of the brake shoe is generally flat at the point where the outer peripheries of the gears come together, so that when the brake shoe is moved towards the gears the pocket is formed by the tooth flanks, the generally flat surface and the end face sealing surfaces of the brake shoe.

29. A brake according to claim 28 including a balance piston for holding the shoe against the gears, and including a channel opening into the generally flat surface for discharging braking fluid from the pocket to said balancing piston to act on the shoe in the same direction as the actuating piston to hold the shoe against the gears.

30. A brake according to claim 27 wherein the actuating piston is displaced by braking fluid under pressure which is fed to the actuating piston through the said channel in the brake shoe.

31. A brake according to claim 30 including an oil pan surrounding the brake shoe for collecting braking fluid ejected from between the gears and from the peripheral sealing surfaces of the brake shoe for recirculation between the gears.

32. A brake according to claim 30 including a supply line for leading braking fluid to the brake, said supply lien including an adjustable throttle valve.

33. A brake according to claim 32 wherein the said throttle valve has an adjustable outlet and also an inlet to which braking fluid under pressure is supplied at substantially constant pressure.

34. A brake according to claim 33 including a second throttle valve, and including an outlet pipeline for the throttle valves arranged through a branch pipeline connected with a pressure-free oil sump, and means for closing the second throttle valve while the first throttle valve opens.

35. A brake according to claim 34 wherein both throttle valves are combined in one casing and their respective pistons are mounted on the same control rod.

36. An arrangement of a brake according to claim 27 wherein the said one gear is mounted on the driven shaft of a hydrodynamic-mechanical gear and wherein the braking fluid for the actuation of the brake is diverted from the pressure oil system of the hydraulic torque converter.

References Cited

UNITED STATES PATENTS

| | | | |
|---|---|---|---|
| 1,626,542 | 4/1927 | Larson | 188—92 |
| 1,692,801 | 11/1928 | Jensen | 188—92 |
| 2,355,484 | 8/1944 | Teker. | |
| 2,438,154 | 3/1948 | Dickens | 188—92 X |
| 3,136,392 | 6/1964 | Rodway. | |

GEORGE E. A. HALVOSA, Primary Examiner

U.S. Cl. X.R.

188—264; 192—61